United States Patent [19]

Sasaki et al.

[11] Patent Number: 4,922,959
[45] Date of Patent: May 8, 1990

[54] FILTER ARRANGEMENT FOR FUEL TANK

[75] Inventors: Michiaki Sasaki, Hadano; Joji Masuda, Ebina, both of Japan

[73] Assignee: Nissan Motor Co., Ltd., Yokohama, Japan

[21] Appl. No.: 177,368

[22] Filed: Apr. 4, 1988

[30] Foreign Application Priority Data

Apr. 7, 1987 [JP] Japan ............... 62-51590[U]

[51] Int. Cl.⁵ .......................................... F02M 37/20
[52] U.S. Cl. .................. 137/587; 137/590; 137/202; 123/514; 123/516
[58] Field of Search ............... 137/590, 587, 202; 123/514, 516

[56] References Cited

U.S. PATENT DOCUMENTS

| | | | |
|---|---|---|---|
| 2,252,687 | 8/1941 | Bassett | 137/202 |
| 2,528,600 | 11/1950 | Lombard | 137/202 |
| 3,221,800 | 12/1965 | Ballou | 137/590 X |
| 3,703,165 | 11/1972 | Hansen | 137/202 X |
| 3,993,094 | 11/1976 | Spooner | 137/590 X |
| 4,129,503 | 12/1978 | Joseph | 137/590 X |
| 4,279,232 | 7/1981 | Schuster et al. | 123/516 |
| 4,546,750 | 10/1985 | Brunell et al. | 123/514 |
| 4,672,937 | 6/1987 | Fales et al. | 123/516 X |

FOREIGN PATENT DOCUMENTS 61-026617 8/1986 Japan .

Primary Examiner—John Rivell
Attorney, Agent, or Firm—Foley & Lardner, Schwartz, Jeffery, Schwaab, Mack, Blumenthal & Evans

[57] ABSTRACT

A filter arrangement disposed within a fuel tank and adapted to prevent vapor lock. The filter arrangement is comprised of a fuel sucking section which is communicated through a connecting pipe section with a fuel pump. The fuel sucking section is provided with a netting member through which fuel in the fuel tank is sucked into a chamber defined inside the fuel sucking section, upon operation of the fuel pump. The fuel sucking section is formed with a through-hole through which fuel vapor staying inside the fuel sucking section is releasable out of the fuel sucking section. Additionally, a valve mechanism is provided to normally close the through-hole but open the through-hole in presence of fuel vapor inside the fuel sucking section, thereby effectively preventing fuel vapor from sucking into the fuel pump.

17 Claims, 4 Drawing Sheets

FILTER ARRANGEMENT FOR FUEL TANK

BACKGROUND OF THE INVENTION

1. Field of the Invention

The present invention relates to improvements in a filter arrangement disposed in a fuel tank and connected to a fuel pump in a fuel supply system of an automotive vehicle, and more particularly to such a filter arrangement provided with a function to prevent vapor lock caused by fuel vapor staying in the filter arrangement.

2. Description of the Prior Art

A variety of filter arrangements for a fuel tank have been proposed and put into practical use. One of these includes a fuel sucking section which is disposed within a fuel tank and connected through a connecting pipe section with a fuel pump disposed in the fuel tank. The fuel sucking section is provided with a netting member which serves as a filter by which fuel to be sucked to the fuel pump is filtered. However, when an automotive vehicle temporarily stops after cruising so that fuel temperature is high, fuel vapor is generated around the fuel pump and unavoidably fed to the fuel sucking section where it remains in the upper part of a space within the fuel sucking section. Thus the aforementioned fuel vapor is sucked into the fuel pump upon restart of the fuel pump, thereby causing vapor lock.

SUMMARY OF THE INVENTION

A filter arrangement according to the present invention is comprised of a connecting pipe section disposed in a fuel tank and fluidly connected to a fuel pump at a suction port. The connecting pipe section is further connected to a fuel sucking section which is disposed in the fuel tank and includes a netting member through which fuel in said fuel tank is sucked upon operation of said fuel pump into a chamber defined inside the fuel sucking section. The chamber is in fluid communication with the inside of the connecting pipe section. The fuel sucking section is formed with a through-hole through which fuel vapor present in the chamber is releasable. Additionally, a valve mechanism is provided to normally close the through-hole and open the through-hole in the presence of fuel vapor inside of the fuel sucking section.

Accordingly, during operation of the fuel pump, fuel vapor does not flow into the fuel sucking section and therefore the valve mechanism closes the through-hole for releasing the fuel vapor. When the fuel pump is stopped so that vapor of warmed fuel flows into the fuel sucking section, the valve mechanism opens the through-hole under the pressure of the fuel vapor thereby allowing the fuel vapor to be released out of the fuel sucking section through the through-hole. Thus, fuel vapor is prevented from staying inside the fuel sucking section. As a result the fuel vapor is not sucked toward the fuel pump and the occurence of vapor lock is avoided.

BRIEF DESCRIPTION OF THE DRAWINGS

In the drawings, like reference numerals designate corresponding parts and elements throughout all the figures, in which.

DETAILED DESCRIPTION OF THE INVENTION

Figure 1:
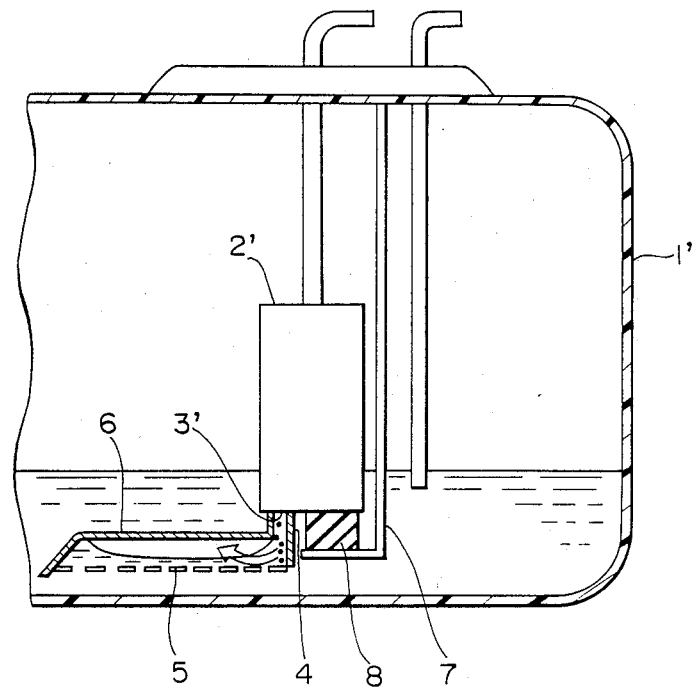
FIG. 1 is a schematic vertical sectional view of a fuel suction system in a fuel tank, showing a conventional filter arrangement for a fuel tank and illustrating disadvantages of the filter arrangement.

To facilitate understanding of the present invention, a brief reference will be made to a conventional filter arrangement depicted in FIG. 1 as disclosed in Japanese Utility Model Publication No. 61-26617. Referring to FIG. 1, the conventional filter arrangement is housed in a fuel tank 1' of an automotive vehicle. This filter arrangement includes a connecting pipe section 4 connected to a gear pump (fuel pump) 2' in such a manner that the inside of the connecting pipe section 4 is in fluid communication with the suction port 3' of the pump 2'. A fuel sucking section 6 is formed integral with the connecting pipe section 4 and provided at its lower part with a netting member 5 through which fuel is sucked inside the filter arrangement. The reference numeral 7 denotes a bracket for suporting the pump 2 to the tank 1' through an elastic member 8.

Difficulties have been encountered in a fuel suction system including such a conventional filter arrangement, in which the filter arrangement becomes a cause of so-called vapor lock in which the fuel pump rotates without fuel thereby making the process of supplying fuel impossible. This is because fuel vapor is generated in the pump 2' when the automotive vehicle stops temporarily after cruising so that the fuel is high in temperature. The fuel vapor thus generated flows out into the fuel sucking section 6 since the side of pump suction port 3' is higher in pressure than the fuel sucking section 6, so that the fuel vapor stays at an upper part of the fuel sucking section 6 as illustrated in FIG. 1. It will be understood that the aforementioned fuel vapor is sucked into the pump 2' through the connecting pipe section 4 and the pump suction port 3' when the pump 2' is restarted, thereby causing vapor lock. In this connection, assuming that the upper part of the fuel sucking section 6 is formed of a netting member, the perforations of the netting member are usually fine. Accordingly fuel vapor will not escape through the netting member as a result of of surface tension thereby causing vapor lock.

Figure 2:
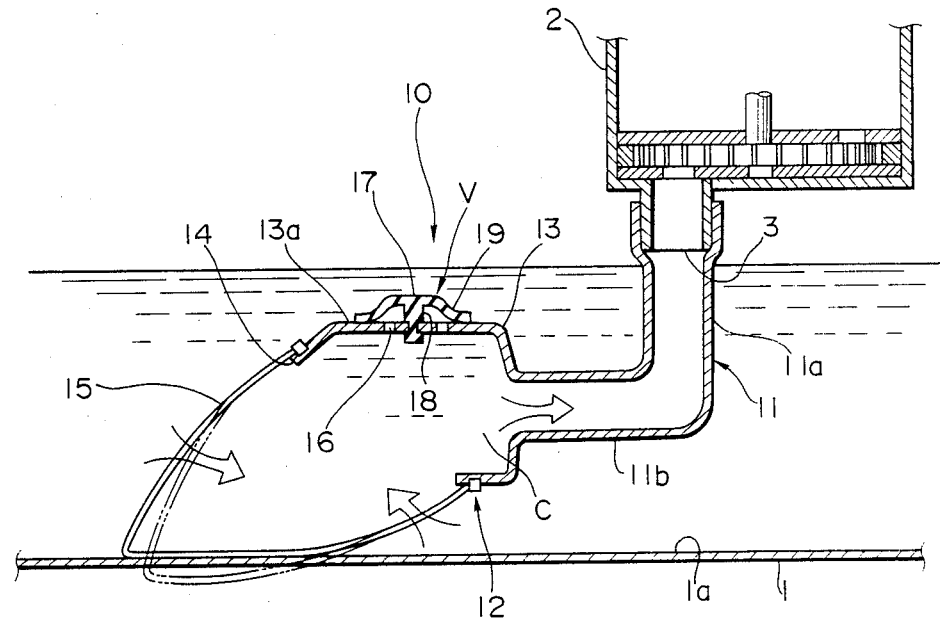
FIG. 2 is a vertical sectional view of a fuel suction system in a fuel tank, including a first embodiment of a filter arrangement for a fuel tank.
Figure 3:
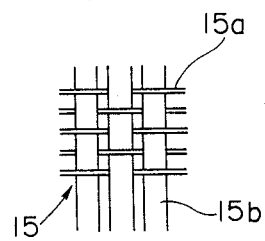
FIG. 3 is a fragmentary enlarged view of a netting member used in the filter arrangement of FIG. 2.
Figure 4:
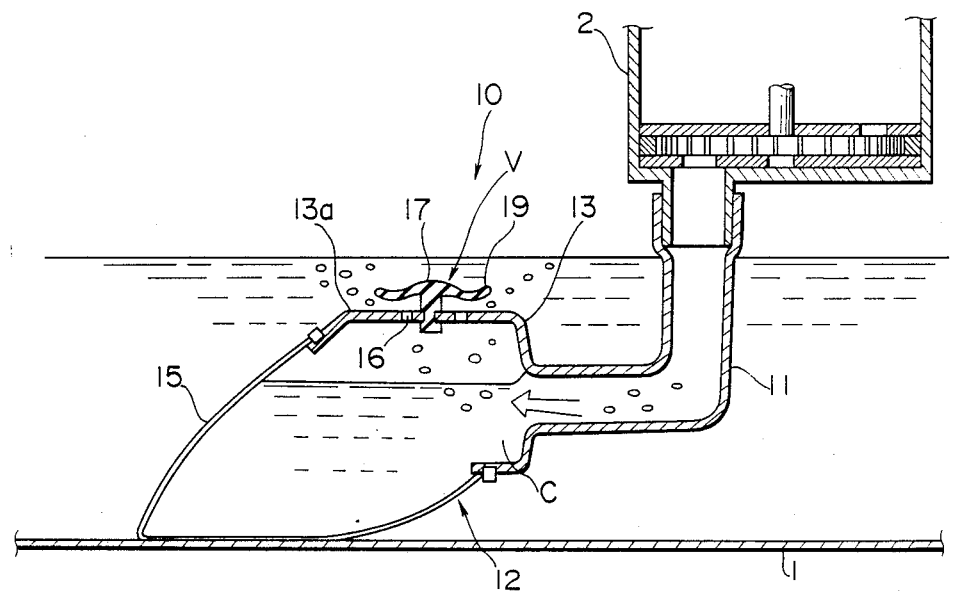
FIG. 4 is a vertical sectional view similar to FIG. 2 but showing an operational mode of the filter arrangement of FIG. 2.

In view of the above description of the conventional filter arrangement, reference is now made to FIGS. 1 to 7, and more specifically to FIGS. 2 to 4 wherein a first embodiment of a filter arrangement is illustrated by the reference numeral 10. The filter arrangement 10 is housed in a fuel tank 1 of an automotive vehicle and is comprised of a connecting pipe section 11 connected to a fuel pump or gear pump 2 in such a manner that the inside of the pipe section 11 is in fluid communication with a suction port 3 of the pump 2. A fuel sucking section 12 of the filter arrangemnt 10 includes a cup-shaped base portion 13 which is integral with the connecting pipe section 11 and enlarged in cross-section to define thereinside an inside space or chamber C of a relatively large volume. A netting member 15 is secured to the opening peripheral part 14 of the base portion 13. The netting member 15 is generally bag-shaped and has a sharply bent tip end section formed by bending the netting member 15 at an acute angle. The netting member 15 is formed from woven material as shown in FIG. 3 and constituted of fine linear materials 15a which extend in a direction from the base portion 13 to its tip end section, and wide linear materials 15b which cross the fine linear materials at right angles.

As shown, in this embodiment, the connecting pipe section 11 is bent at right angles to form a vertically extending upper pipe portion 11a connected to the fuel pump 2, and a horizontally extending lower pipe portion 11b integral with the fuel sucking section base portion 13. Additionally, the length of the connecting pipe section 11 is set so that the netting member 15 is brought into elastic contact with the bottom surface 1a of the fuel tank 1.

The sucking section base portion 13 is formed at its upper part with a plurality of circularly arranged small through-holes 16 through which fuel vapor can pass to be released out of the chamber C inside the fuel sucking section 12. The fuel vapor is generated on the side of the pump 2 and flows into the chamber C inside the fuel sucking section 12. The size of each through-hole 16 is determined upon taking into account the surface tension in connection with fuel vapor, and therefore is determined to be large as compared with perforations of the netting member 15. A valve member 17 forming a valve mechanism V is provided to normally interrupt communication between the inside and outside of the fuel sucking section 12 while establishing the communication in the presence of fuel vapor pressure within the fuel sucking section 12. The valve member 17 is formed of an oil-resistant elastomeric material and is one-piece structure. The valve member 17 is generally umbrella-shaped and includes a vertically extending support section 18 secured to the upper wall 13a of the fuel sucking section base portion 13. The support section 18 is formed at its upper portion with a circular flap section 19 which is located over the through-holes 16 and contactable with the surface of upper wall 13a of the base portion 13 on the outside of the through-holes 16. The thickness and the size of the flap section 19 of the valve member 17 is so set as to bend upwardly to release fuel vapor through the through-holes 16 under pressure of fuel vapor which has flown into and is staying inside the base portion 13.

With the thus configured filter arrangement 10, during driving of the pump 2, fuel is sucked from the suction port 3 of the pump 2 so that vacuum like condition is developed within the fuel sucking section 12. As a result, the annular flap section 19 of the valve member 17 is brought into tight contact with the base portion upper wall 13a under sucking action, so that the valve member 17 is maintained in a condition to close the through-holes 16 thereby to block communication of the inside and outside of the fuel sucking section 12 through the through-holes 16. In this condition, the bag-shaped netting member 15 seems to become deflated; however, the netting member 15 is higher in rigidity because the wider linear materials 15b are used and therefore deflation is effectively prevented. Additionally, since the netting member 15 is in contact with the fuel tank bottom wall 1a, fuel sucking or supply can be effectively accomplished even if only a little fuel remains in the fuel tank 1. Further, owing to a higher rigidity of the netting member 15, the netting member 15 can be brought into press contact with the fuel tank bottom wall 1a without using a biasing member such as spring, so that a fuel tank bottom standard of the filter arrangement 10 can be obtained even in a simple construction.

As shown in FIG. 4, when the pump 2 is stopped immediately after vehicle cruising, vapor of high temperature fuel flows into the inside of the fuel sucking section 12 and seems to stay inside the fuel sucking section 12. However, the fuel vapor is higher in pressure and therefore pushes up the annular flap section 19 of the valve member 17 thereby allowing the fuel vapor to be released outside the fuel sucking section 12 through the through-holes 16. Thus, the valve member 17 is put into its opening condition. Accordingly, the fuel vapor is prevented from staying within the fuel sucking section 12. As a result, when the pump 2 is operated after this, only liquid fuel is sucked to the pump 2 thus preventing vapor lock.

Figure 5:
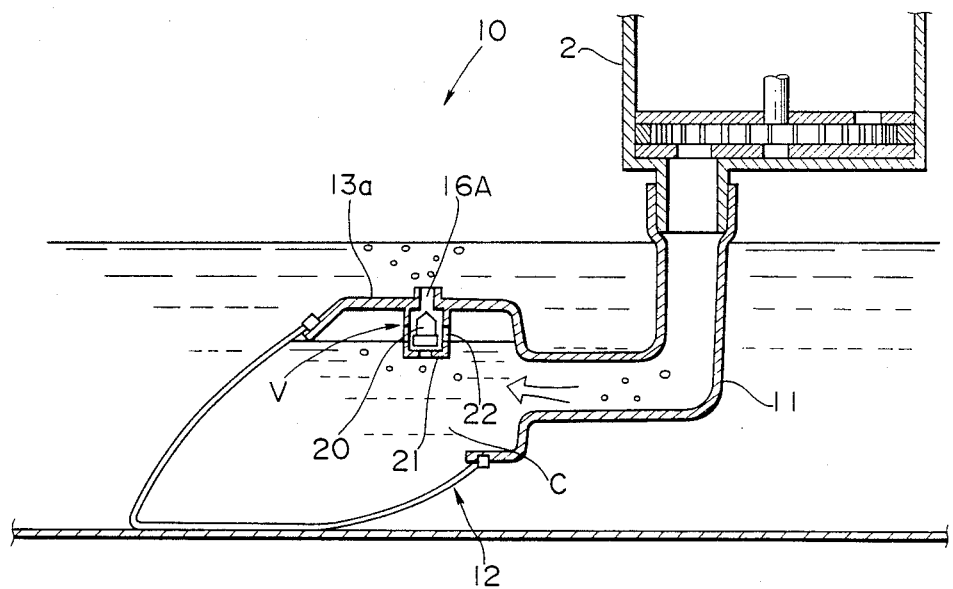
FIG. 5 is a vertical sectional view of the fuel suction system including a second embodiment of the filter arrangement according to the present invention.

FIG. 5 illustrates a second embodiment of the filter arrangement 10 in accordance with the present invention which is similar to the first embodiment filter arrangement except for the structure of the valve mechanism V. In this embodiment, the valve mechanism V includes a float valve member 20 which is floatable by fuel and moves upwardly in the drawing so as to close a through-hole 16A formed in the upper wall 13a of the fuel sucking section base portion 13. The float valve member 20 is movably disposed inside a cylindrical housing section 21 secured to the base portion upper wall 13a. The housing section 21 is formed with a plurality of through-holes 22 through which fuel vapor can pass.

With this arrangement, under a normal condition in which the fuel sucking section 12 is filled with liquid fuel, the float valve member 20 is urged upwardly under buoyant force of fuel thereby closing the through-hole 16A. When the fuel vapor flows inside the fuel sucking section 12 and remains in the upper part of the inside of the fuel sucking section 12, the level of liquid fuel inside the fuel sucking section 12 descends under the pressure of the fuel vapor. As a result, the float valve member 20 moves downwardly thereby opening the through-holes 16A, so that the fuel vapor passes through the openings 22 of the housing section 21 and the through-hole 16A to be discharged out of the fuel sucking section 12. Thus, the fuel vapor is effectively prevented from staying inside the fuel sucking section 12.

Figure 6:
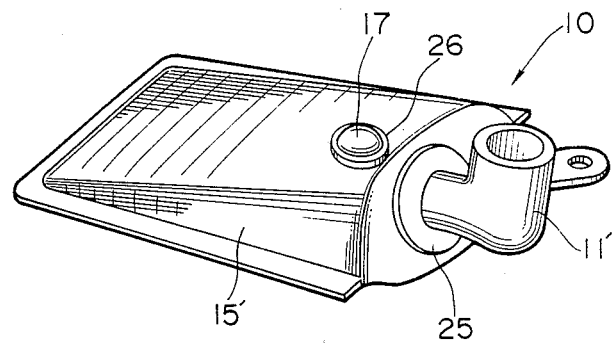
FIG. 6 is a perspective view of a third embodiment of the filter arrangement according to the present invention.
Figure 7:
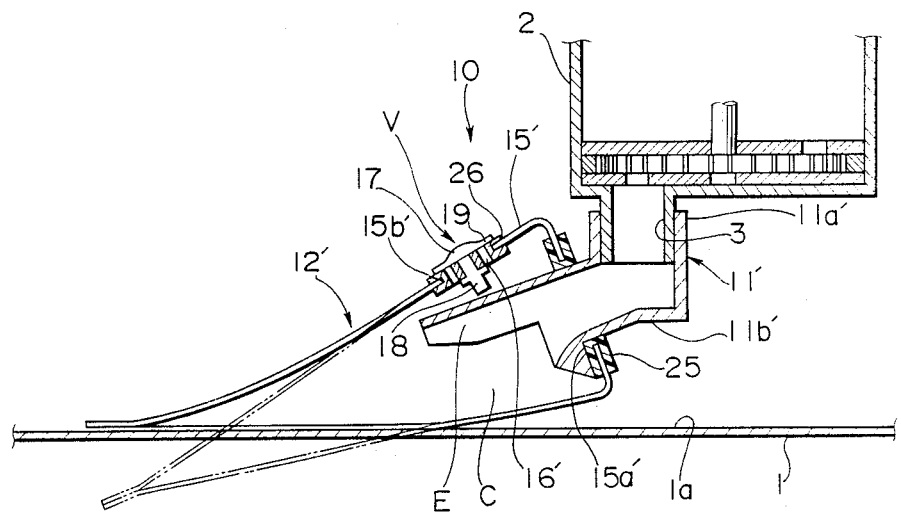
FIG. 7 is a vertical sectional view of the fuel suction system including the third embodiment filter arrangement of FIG. 6.

FIGS. 6 and 7 illustrate a third embodiment of the filter arrangement 10 according to the present invention, which is similar to the first embodiment filter. In this embodiment, the connecting pipe section 11' is bent so that the lower pipe section 11b' connects at an obtuse angle to the upper pipe member 11a'. As shown, the lower pipe section 11b' gradually inclines downwardly. The lower half wall of the tip end part E of the lower pipe portion 11b' is cut out so that it opens widly in a downward direction. In this embodiment, the fuel sucking section 12' includes the bag-shaped netting member 15' formed of the fine and wide linear materials as shown in FIG. 3. The netting member 15' is formed with an opening 15a' through which the lower pipe portion 11b' of the connecting pipe section 11' passes and extends inside the netting member 15'. As shown, a grommet 25 is fitted in the opening 12a' in such a manner that the netting member 15' is securely mounted on the connecting pipe section 11' at the intermediate part. The netting member 15' is formed with an opening 15b' which is located to face the tip end part E of the connecting pipe section lower pipe portion 11b'. A disc member 26 is fitted in the opening 15b' and formed with a central through-hole (not identified) and a plurality of through-holes 16' formed around the central through-hole. As shown, the valve member 17 forming the valve mechanism V is disposed in such a manner that the support section 8 thereof is inserted in the central through-hole while the circular flap section 19 covers the through-holes 16'. It will be understood that the valve member 17 in this embodiment operates similarly in the first embodiment filter arrangement 10.

With this arrangement, since the tip end part E of the connecting pipe section lower pipe portion 11b' is partly cut out, the flow passage area of the connecting pipe section 11' gradually increases without an abrupt change, so that cavitation does not tend to occur during sucking of fuel toward the pump 2. Furthermore, since the tip end part E is disposed inside the fuel sucking section 12', it interrupts movement of fuel vapor in the sucking direction even if the fuel vapor stays at the upper side of the chamber C inside the fuel sucking section 12. For example, owing to the fact that the valve member 17 becomes difficult to be opened, thereby the fuel vapor is not able to be sucked sucked toward the side of the suction port 3 of the fuel pump 2. Additionally, by virtue of this tip end part E of the connecting pipe section lower pipe portion 11b', the connecting pipe section 11' opens at a level considerably lower than the through-holes 16', and therefore a sufficient amount of fuel to be sucked can be maintained even if the valve member 17 is accidentally kept opened. It will be understood that the filter arrangement 10 of this embodiment fundamentally operates in the same manner as in the first embodiment filter arrangement.

What is claimed is:

1. A filter arrangement for a fuel tank, comprising:
   a connecting pipe section disposed in said fuel tank and fluidly connected to a fuel pump at a suction port;
   a fuel sucking section disposed in said fuel tank and fluidly connected with said connecting pipe section, said fuel sucking section including a netting member through which fuel in said fuel tank is sucked into a chamber defined inside said fuel sucking section, upon operation of said fuel pump, said chamber being in fluid communication with inside of said connecting pipe section;
   said connecting pipe section maintaining a fluid tight connection between said fuel pump and said fuel sucking section so that fuel vapor from a side of said fuel pump at the suction port is supplied through said connecting pipe section to said chamber of said fuel sucking section;
   means defining a through-hole in said fuel sucking section through which through-hole the fuel vapor present in said chamber is releasable;
   a valve mechanism adapted to normally close said through-hole and open said through-hole to release the fuel vapor present inside said fuel sucking section; and
   means for trapping the fuel vapor near said through-hole in said fuel sucking section.

2. A filter arrangement as claimed in claim 1, wherein said fuel sucking section includes a generally cup-shaped base portion integral with said connecting pipe section, wherein said netting member is generally bag-shaped and secured to said base portion to define said chamber.

3. A filter arrangement as claimed in claim 1, wherein said connecting pipe section includes a first pipe portion fluidly connected to the fuel pump suction port and extending generally vertical, and a second pipe portion integral with said first pipe portion and extending generally horizontal.

4. A filter arrangement as claimed in claim 3, wherein said through-hole and said valve mechanism are located over level of said connecting pipe section second pipe portion.

5. A filter arrangement as claimed in claim 3, wherein said fuel vapor trapping means includes an upper part of said fuel sucking section, said upper part being formed with said through-hole and located over the level of said connecting pipe section second pipe portion.

6. A filter arrangement as claimed in claim 3, wherein said connecting pipe section second pipe portion is disposed inside said fuel sucking section and extends below said through-hole.

7. A filter arrangement as claimed in claim 3, wherein said connecting pipe section second pipe portion has a tip end part whose lower wall is cut to enlarge an opening.

8. A filter arrangement as claimed in claim 3, wherein said fuel sucking section is formed of a netting member formed with an opening in which said connecting pipe section second pipe portion is disposed through a grommet.

9. A filter arrangement as claimed in claim 1, wherein said through-hole is formed in an upper part of said fuel sucking section.

10. A filter arrangement as claimed in claim 9, wherein said valve mechanism includes an umbrella-shaped valve member having a central support section secured to the upper part of said fuel sucking section, and an annular flap section which normally closes said through-hole and opens said through-hole in response to pressure of said fuel vapor present inside the upper part of said fuel sucking section.

11. A filter arrangement as claimed in claim 1, wherein said valve mechanism includes a float valve member adapted to normally close said through-hole and open said through-hole when level of fuel inside said fuel sucking section is lowered under pressure of said fuel vapor.

12. A filter arrangement for a fuel tank, comprising:
   a connecting pipe section disposed in said fuel tank and fluidly connected to a fuel pump at a suction port;
   a fuel sucking section disposed in said fuel tank and fluidly connected with said connecting pipe section, said fuel sucking section including a netting member through which fuel in said fuel tank is sucked into a chamber defined inside said fuel sucking section, upon operation of said fuel pump, said chamber being in fluid communication with inside of said connecting pipe section;
   means defining a through-hole in said fuel sucking section through which through-hole fuel vapor present in said chamber is releasable;

a valve mechanism adapted to normally close said through-hole and open said through-hole to release the fuel vapor in presence of fuel vapor inside said fuel sucking section;

wherein said connecting pipe section includes a first pipe portion fluidly connected to the fuel pump suction port and extending generally vertical and a second pipe portion integral with said first pipe portion and extending generally horizontal and wherein said connecting pipe section second pipe portion is disposed inside said fuel sucking section and extends below said through-hole.

13. A filter arrangement as claimed in claim 12, wherein said connecting pipe section second pipe portion has a tip end part whose lower wall is cut out to enlarge an opening.

14. A filter arrangement as claimed in claim 13, wherein said fuel sucking section is formed of a netting member formed with an opening in which said connecting pipe section second pipe portion is disposed through a grommet.

15. A filter arrangement for a fuel tank, comprising:
a connecting pipe section disposed in said fuel tank and fluidly connected to a fuel pump at a suction port;
a fuel sucking section disposed in said fuel tank and fluidly connected with said connecting pipe section, said fuel sucking section including a netting member through which fuel in said fuel tank is sucked into a chamber defined inside said fuel sucking section, upon operation of said fuel pump, said chamber being in fluid communication with inside of said connecting pipe section;
said connecting pipe section maintaining a fluid tight connection between said fuel pump and said fuel sucking section so that fuel vapor from a side of said fuel pump at the suction port is supplied through said connecting pipe section to said chamber of said fuel sucking section;
means defining a through-hole in said fuel sucking section through which through-hole the fuel vapor present in said chamber is releasable;
a valve mechanism adapted to normally close said through-hole and open said through-hole to release fuel vapor present inside said fuel sucking section;
said connecting pipe section includes a first pipe portion fluidly connected to the fuel pump suction port and extending generally vertical, and a second pipe portion integral with said first pipe portion and extending generally horizontal;
wherein said connecting pipe section second pipe portion is disposed inside said fuel sucking section and extends below said through-hole.

16. A filter arrangement as claimed in claim 15, wherein said connecting pipe section second pipe portion has a tip end part whose lower wall is cut out to enlarge an opening.

17. A filter arrangement is claimed in claim 16, wherein said fuel sucking section is formed of a netting member formed with an opening in which said connecting pipe section second pipe portion is disposed through a grommet.

* * * * *